March 1, 1955     O. K. VORWERK     2,702,967
METHOD OF AND DEVICE FOR MAKING POROUS MATERIAL FROM
FIERY MOLTEN MASSES, ESPECIALLY BLAST FURNACE SLAG
Filed Jan. 18, 1951     6 Sheets-Sheet 5

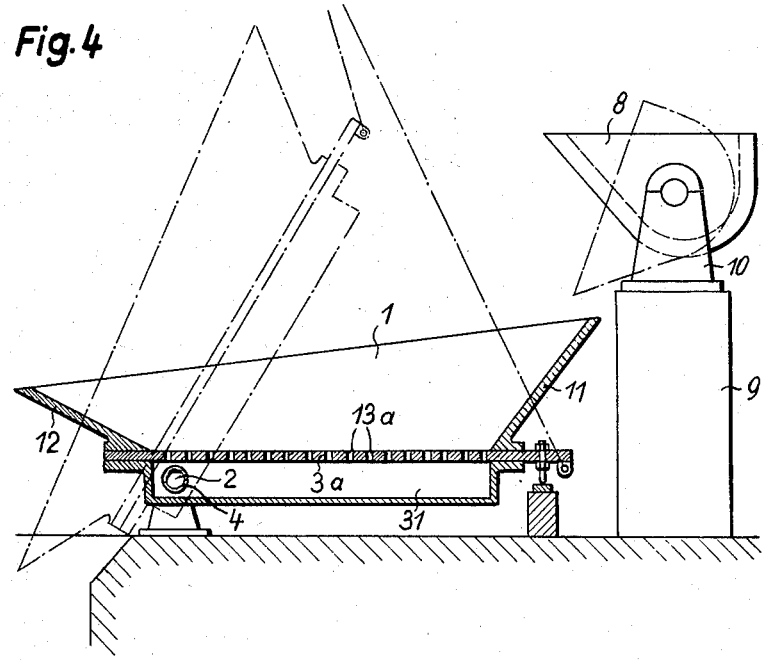
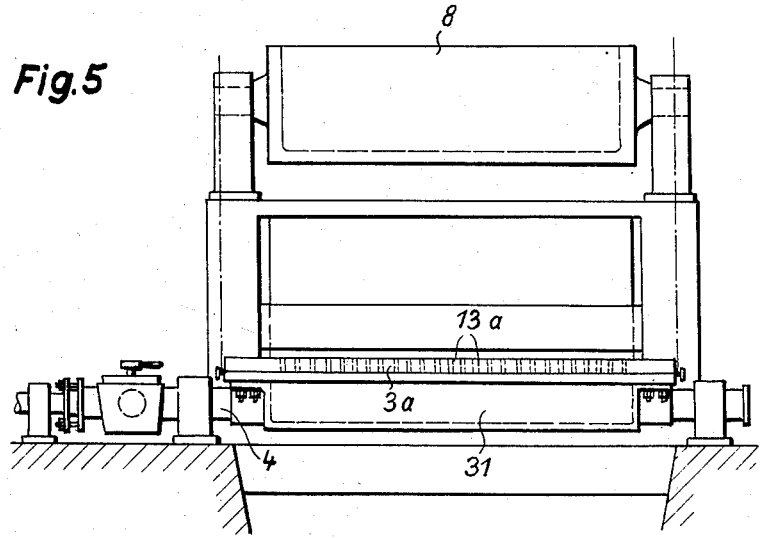

*Inventor:*
OTTO KARL VORWERK
BY Toulmin & Toulmin
ATTORNEYS

United States Patent Office 2,702,967
Patented Mar. 1, 1955

2,702,967

METHOD OF AND DEVICE FOR MAKING POROUS MATERIAL FROM FIERY MOLTEN MASSES, ESPECIALLY BLAST FURNACE SLAG

Otto Karl Vorwerk, Rheinhausen, Germany, assignor to Hüttenwerk Rheinhausen Aktiengesellschaft, Rheinhausen, Germany Application January 18, 1951, Serial No. 206,601

19 Claims. (Cl. 49—14)

This invention concerns the treatment of fiery molten masses such as blast furnace slags.

It has already been proposed to cause fiery molten masses in particular blast furnace slags to foam, for the manufacture of porous building materials, by causing water to rise under pressure through nozzles which are present in the bottom of a pouring bed receiving the molten mass whereby a portion of the water evaporates. This process has the disadvantage that the water which remains behind in the treated material can only be removed from the latter with difficulty. The material must be removed from the pouring bed and be spread out for drying so that the loading of the material after drying is rendered difficult. Even by adopting this troublesome procedure the water can only be partially removed from the material so that no highly valuable porous slag is obtained.

It is, therefore, an object of the present invention to provide a method of preparing porous building material from fiery molten masses, especially blast furnace slags, which, while easily being carried out, will produce a highly valuable powder dry foam slag.

It is a further object of this invention to provide an apparatus for producing porous building material from fiery molten masses which will enable the production of powder dry foam slag.

It is still another object of this invention to provide an apparatus of the above mentioned type which will materially speed up the production and loading of the improved building material according to the present invention.

These and other objects and advantages of the present invention will appear more clearly from the following specification in connection with the accompanying drawings, in which:

Fig. 4 shows a longitudinal section through a second embodiment of an apparatus according to the invention.

Fig. 5 shows the front elevation of the device according to Figure 4.

While, as stated above, it was necessary heretofore when producing porous material from fiery molten masses, to eliminate the remainder of the foam creative substance therefrom by removing the material from the pouring bed and spreading it out for drying, the process according to the present invention eliminates this necessity. To this end, the foaming agent is drawn off from the pouring bed at the end of the foaming process. Precautions are thus taken which render it possible for the foaming agent such as water to escape downwards, and flow out of the material which has been caused to foam. This process is facilitated by the fact that the heat residing in the material evaporates the foaming agent which does not immediately run away, and in this manner drives it off. There is thus obtained a highly valuable powder dry foam slag which may be loaded without further treatment. This is simply effected according to a further step of the invention by tipping up a pouring bed formed of a flat tub. The prepared foam slag can thereby slide directly out of the pouring bed into a wagon so that transport costs are considerably reduced.

It is particularly advantageous to carry out the invention in combination with a process in which the fiery molten mass is rapidly poured on to the pouring bed in a broad stream from an intermediate container.

Figure 1:
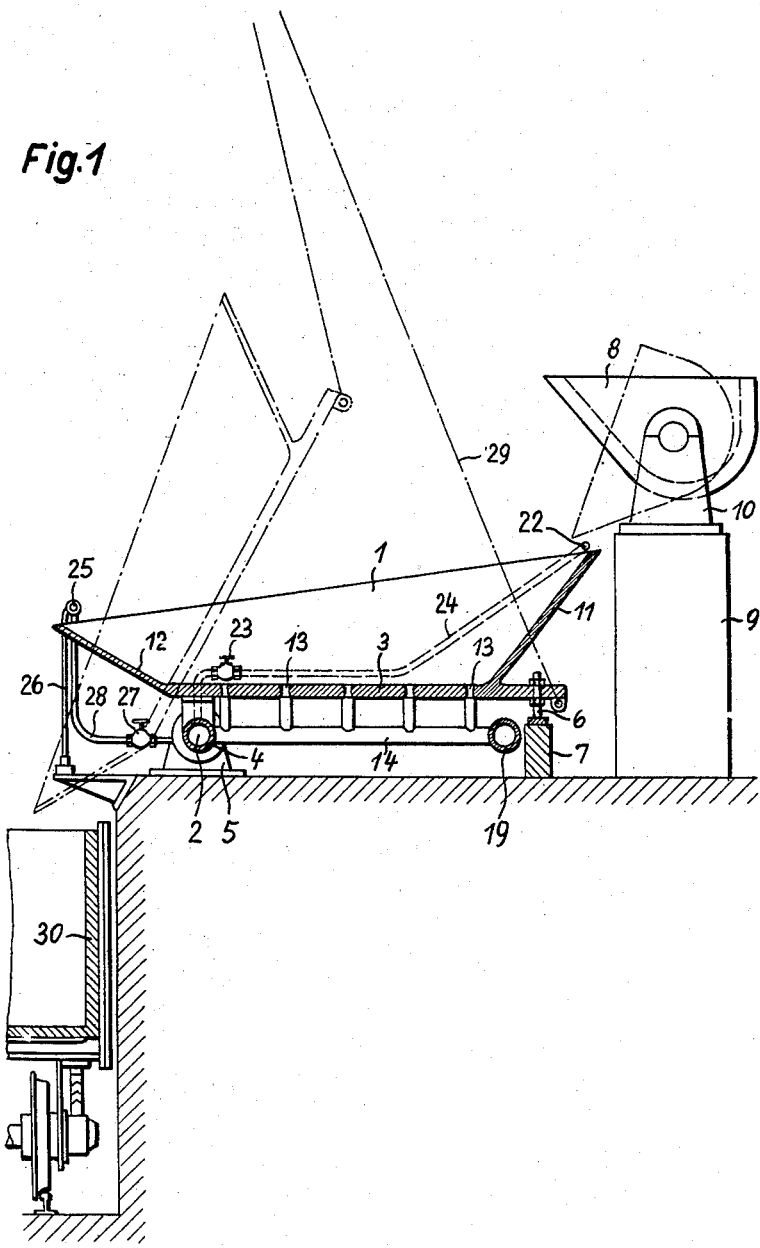
Fig. 1 shows a longitudinal section along the line A—A of Fig. 3 of a first embodiment of the device according to the present invention.
Figure 2:
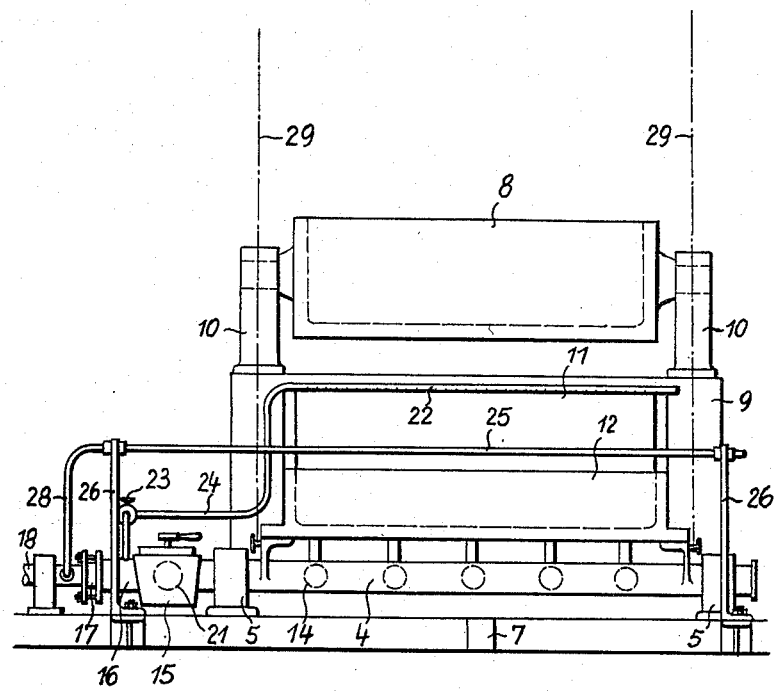
Fig. 2 represents the front elevation of this apparatus.
Figure 3:
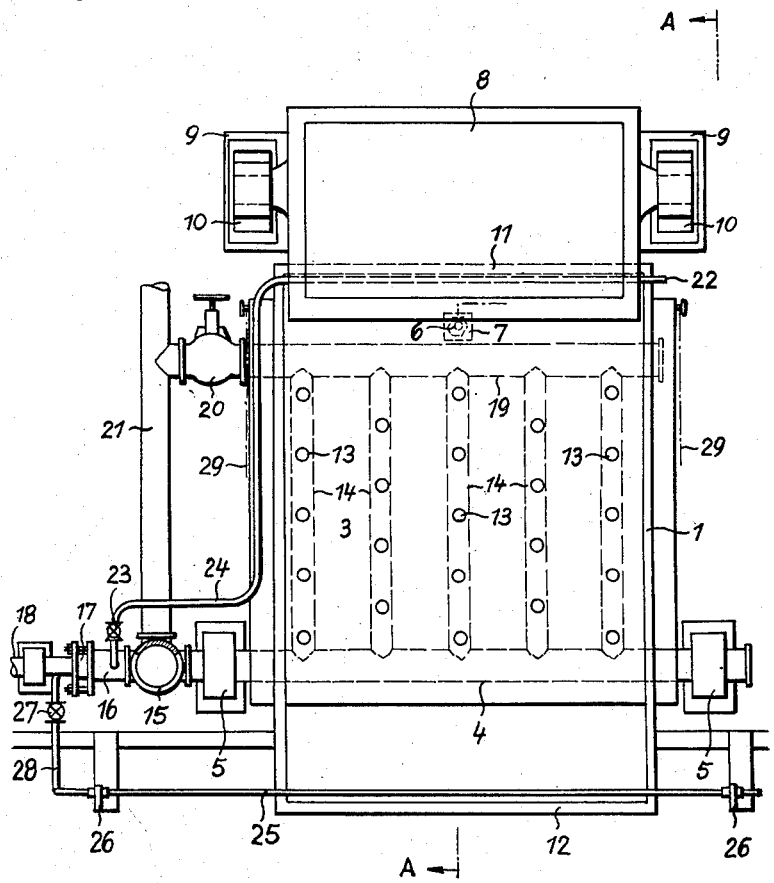
Fig. 3 is the plan view of the apparatus according to Figure 1.

Referring now to the drawings in detail and Figures 1 to 3 thereof in particular, the structure shown therein comprises a pouring bed for example formed of a tub 1, which is preferably made of cast iron or cast steel being substantially impervious and which is tiltable about an axis 2. This axis lies on the left in Fig. 1 i. e. on the pouring side. The bottom 3 of the tub is supported on a pipe 4 which latter is rigidly connected to the tub and is supported by two bearings 5 to allow tilting of the tub about the axis 2. At the opposite end, the extended bottom of the tub rests with an adjustable screw 6 on a socle 7. In the working position of the tub 1, as shown in the drawing, the admission end of the tub lies beneath a trough-like ladle 8 which rests in two bearings 10 on a raised foundation 9. The length of the ladle 8 is about equal to the width of the tub 1. The arrangement is so devised that the ladle in the tipping position (shown dotted) pours into the tub. The cross wall 11 lying at the reception end of the tub is inclined to such an extent that the liquid slag poured on to this wall is led to the opposite end of the tub. The kinetic energy of the slag is thus used up in spreading the slag over the bottom 3. In order to increase this action, the wall 11, instead of being straight, could also be suitably curved. The cross wall 12 of the tub 1 at the opposite end is also inclined in such a manner that, when the tub is tipped (as shown in dotted lines in Fig. 1), it forms a slide for the material to be tipped out of the tub.

In the bottom 3 of the tub 1 are nozzles 13 through which the foaming agent e. g. water under pressure, is able to pass from below. The nozzles 13 are connected to several pipes 14 lying longitudinally below the bottom of the tub and proceeding from pipe 4 which is closed at one end (the right hand side in Fig. 3). The other end of pipe 4 has connected thereto a three way valve 15 which through a pipe 16 and a stuffing box 17 is connected with a supply pipe 18 for the foaming agent. The pipes 14 are at their ends remote from the pipe 4 united by a pipe 19 which is sealed at one end (the right hand end in Fig. 3) and at the opposite end opens into a branch pipe 21 through a shut off valve 20. The branch pipe 21 is at one end connected to the three way valve 15. The other end (not shown) of the pipe 21 taking part in the tipping motion of the tub 1, extends into an outlet container.

In the position shown in Fig. 3, the valve 15 closes the connection of the pipe 21 and establishes connection between the supply pipe 18 or the pipe 16 on one hand and the pipe 4 on the other hand.

By rotating the stem of the valve 15 in counterclockwise direction, the connection of the pipe 16 as also that of the pipe 21 can be closed. By further rotation in the same direction, the connection is made between the pipes 4 and 21, while the connection of the pipe 16 remains closed. At the pouring-in end of the tub 1 is fastened a spray pipe 22 which is provided in a manner known per se with spray openings for the water to be sprayed and extends along the upper edge of the wall 11, Fig. 2. Pipe 22 is connected with the pipe 16 through a pipe 24 containing a shut off valve 23. At the exit end of the tub there is provided a spray pipe 25 which in the working position of the tub shown extends along the upper edge of the wall 12. It is carried by a support 26 and connected with the stationary pipe 18 by a pipe 28 containing a shut off valve 27.

The tipping of the tub 1 is accomplished by a winding gear, not shown. Two ropes 29 (Fig. 1) are fastened at the sides to the end of the bottom 3 of the tub remote from the tipping axis 2. These ropes are led over pulleys to a bracket (not shown) above the tub, which bracket rests on supports on both sides of the tub. From here the ropes are led to winches standing on the floor. Obviously the tub can be tipped in any other manner. Below the exit end of the tub are provided wagons 30 to take up the prepared material.

The process according to the invention is carried out in the following manner. The glowing liquid slag coming from the blast furnace is first of all filled into the ladle 8, solidified slag portions being held back. Before pouring the slag into the tub 1 whilst the stem of the three way valve 15 assumes the position shown in Fig. 3 and the valve 20 is closed, so much water is allowed to flow from the pipe 18 that the pipes 4, 14 and 19 as well as the nozzles 13 are filled and the bottom 3 is just wetted whereupon by turning the stem of valve 15 in a counterclockwise direction, the pipe 16 is closed and thereby the further supply interrupted. The connection between the outlet pipe 21 and pipe 4 remains interrupted. Preferably, by suitably adjusting the supporting screw 6, the tub 1 is given such an inclination by a slight tipping of the tub in clockwise direction with regard to Fig. 1 that the foaming agent will flow over the pouring-in end of the bottom 3 to a somewhat greater extent than over its other parts. Before pouring in the slag, the walls 11 and 12 are moreover sprayed by means of the pipes 22 and 25 so that no slag adheres to them.

Then the ladle 8 is tipped, and the liquid slag flows in a broad flood on to the pouring bed on which it quickly spreads out. At the same time by turning back the stem of the three way valve 15 into the position shown in Fig. 3, water under pressure is supplied which penetrates from the nozzles 13 from below into the slag layer, partly evaporates, and thereby causes the slag to foam.

In accordance with the invention, towards the end of the foaming process, the excess water is now let out of the tub. This is effected by rotating the stem of three way valve 15 counterclockwise from the position shown in Fig. 3 to such an extent that the connection between the pipe 4 and the outlet pipe 21 is made while the connection between the pipe 16 on one hand and pipes 4 and 21 on the other hand is interrupted. The water can, therefore, flow out of the pores of the foamed slag through the nozzles 13 and the tubes 4, 14 and 21. The heat content of the slag acts so that moisture remaining behind in the pores of the slag is evaporated and given off as steam. On account of this, there is obtained after a short time a completely dry foam slag of high value which can be transported without further treatment. This is effected simply by tipping the tub about the axis 2 by means of the draw ropes 29 into the position shown in dotted lines in Fig. 1 whereby foam slag slides over the inclined wall 12 into a wagon 30.

If it is desired to scavenge the pipes 14 to avoid their clogging up, the valve 20 is opened and the stem of the three way valve 15 is brought into the position shown in Fig. 3. The water flowing from the pipe 18 will then flow through the pipes 14 and the collecting pipe 19 towards the outflow pipe 21. Naturally, also the withdrawal and discharge of the water from the foam slag according to the invention may be effected through the pipe 19 and the valve 20. However one must then actuate two cut off members lying remote from one another, namely a simple valve in place of the three way valve 15 and the valve 20.

The nozzles 13 may be arranged as individual nozzles or may be comprised in groups, and fed with water in any other than the manner shown. In any case it is possible to regulate the supply of water according to the nature of the slag. It is also possible to regulate the supply of water to the individual nozzles or groups of nozzles, in such a manner that they become effective only sequentially, i. e., in the sequence in which they are reached by the slag poured into the tub. This may be carried out, for instance, by means of a device similar to that illustrated in Figure 7, which will be described below. Unless special means are provided which secure a very rapid spread of the slag over the entire tub, the feature of making the nozzles successively effective is of material importance for the following reason. When the liquid slag is poured into the tub at one end thereof, a certain time still passes by before the slag has spread over the entire tub or pouring bed. If now, at the instant the slag is being poured into the tub, foaming means, e. g. water, were admitted through all nozzles simultaneously, it will be obvious that water would accumulate at that end of the tub which is located opposite the tub end at which the slag is poured into the tub, since the slag will not have advanced from the pouring end of the tub to the opposite tub end by the time the foaming means enter the said last mentioned tub end. Consequently, when reaching the said last mentioned end, the slag is washed by the water which has accumulated there and is not penetrated by said water. In other words, the water flows around the slag, so that a granulated slag rather than a high grade slag will result. This drawback will be avoided according to the present invention by controlling the supply of foaming means, e. g. water, to the various nozzles in such a manner that the respective nozzles become effective only successively, i. e., when the slag poured into the tub reaches them or is flowing over them.

Preferably several tubs acting as pouring beds are arranged one after another, and the ladle 8 is transportable in the direction of its tipping axis along these tubs. Then these tubs can be filled with slag successively. When the last one of these tubs has been filled, the first tub has already been emptied, so that it can be filled again. A considerable amount of slag may thus be poured in uninterrupted supply.

The form of construction according to Figs. 4 and 5 differs from the first mentioned example primarily in that the supply of the foaming agent to the nozzles 13 is not effected by tubes proceeding from the pipe 4 but the tub is provided with a double bottom to distribute the water to the nozzles. There is arranged below the bottom 3a containing the nozzles 13a a second bottom 31 which is united to the bottom 3a to form a container closed on all sides. Provisions for scavenging as they are provided in Fig. 1 in the form of the pipe 19 and the valve 20 are not shown in this construction. As Fig. 4 shows, the bottom 3a containing the nozzles is a separate part from the other parts of the tub and detachably connected to them, for example by flanges. This has the advantage that the bottom 3a which is subjected to especially great wear may easily be changed.

Figure 6:
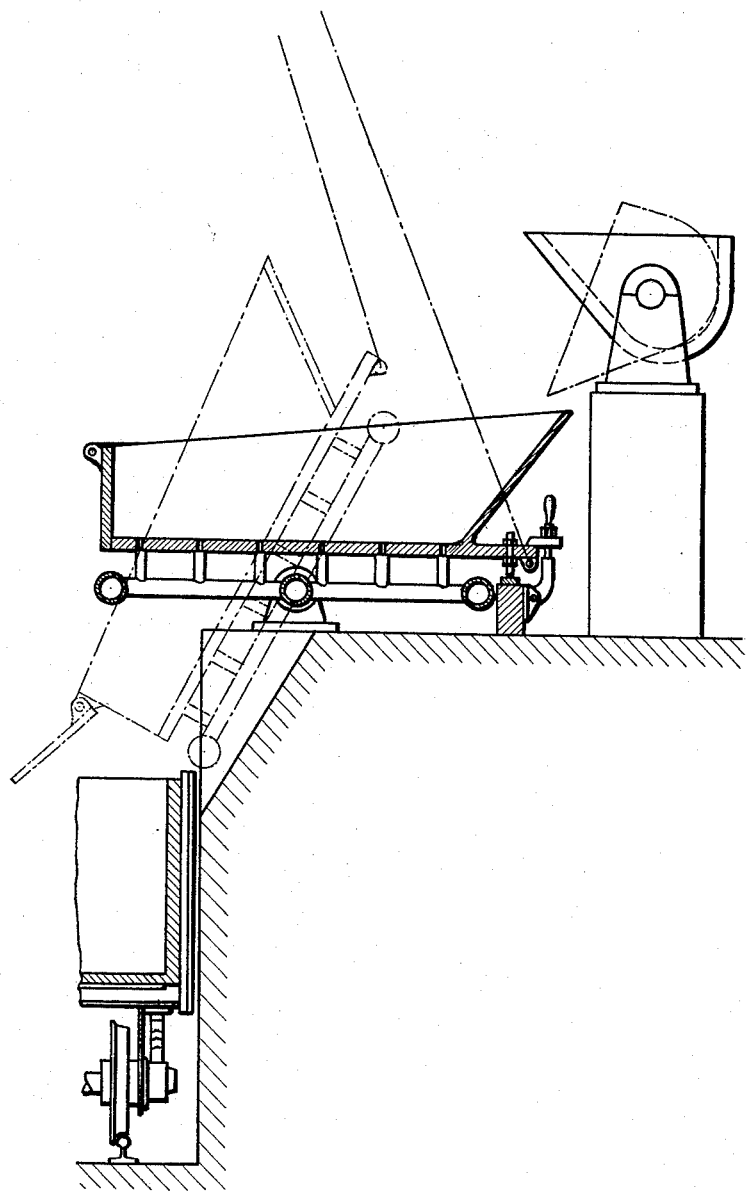
Fig. 6 shows a modification of a portion of the tub which forms a part of the device according to the present invention and is adapted to be loaded with fiery molten masses.

In order to lessen the lifting work on emptying the tub, the tipping axis is positioned almost underneath the center of gravity of the filled tub, preferably however so that still a small turning moment remains which tends to hold the tub in the working position (Fig. 6).

An embodiment of such an arrangement is shown by way of example in Figure 6. The supply pipe 38 for the foaming agent is arranged in the same manner as the supply pipe 4 in Figures 1 to 5 supported by two bearings 39 and connected by way of a three-way valve or similar means (not shown) alternately to a stationary supply pipe and an outlet pipe. From pipe 38, pipes 40 run outwards in both directions. From these pipes 40 short tubes 41 extend upwards to the nozzles 42 in the bottom 43 of the tub. The outer ends of the pipes 40 are connected to pipes 44 each of which is arranged in the same manner as pipe 19 in Figures 1 and 3, at one end closed and at the other end connected by means of a valve (not shown) to an outlet pipe so that it is possible to scavenge the pipes 40. The supply pipe 38 is so arranged that its axis 45 coincides with the tipping axis of the tub which lies almost underneath the center of gravity of the filled tub. But a small turning moment tends to hold the tub in the position shown in full lines in Figure 6. In this position, the tub rests with the adjustable screw 6 on a socle 7 and is held by a locking device 46 which prevents an undesired tipping of the tub, especially when pouring in the slag, and which by swinging outwards about axis 47 can be released before tipping the tub.

Instead of emptying the tub over the oblique wall 12 shown in Figures 1 and 4, there can also be provided at the emptying end of the tub a closable emptying opening. Thus, by way of the example in Figure 6, the tub is provided with a flap valve 48, the tilting axis 49 of which lies nearly at the height of the upper edge of the side walls of the tub and parallel to the tipping axis 45. When the tub is tipped, as shown in dotted lines in Figure 6, the flap valve 48 is opened so that the foam-slag slides down into the wagon 30. Below the pouring out end of the tub there is preferably fitted an abutment, to avoid damaging the supply of the tub when the tub is tilted.

The tipping axis of the tub may instead of being at right angles to the direction in which the slag is poured into the tub, lie parallel to the said direction, according to particular conditions, in particular the supply of slag to the tub and the removal of foam therefrom. For example, the slag can be supplied to the side of the tub instead of the end, and the tub can be arranged to tilt about an axis extending lengthwise thereof or crosswise, as may be desired or necessary.

Figure 7:
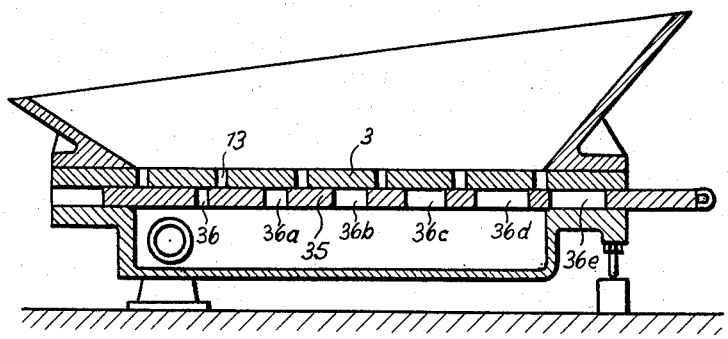
Fig. 7 illustrates control means operable to cause the nozzles associated with the fiery material receiving tub to become effective only sequentially, i. e. in the sequence in which they are reached by the slag poured into the tub at one end thereof.

Referring now to Figure 7, showing a longitudinal section through a tub with a double bottom similar to that of Figure 4, it will be seen that an adjustable plate 35 is slidably mounted below the tub bottom 3 which latter contains the nozzles 13. This plate 35 has arranged therein apertures 36, 36a, 36b, 36c, 36d and 36e which are adapted to register with the corresponding nozzles 13. While in the position shown in Figure 7, the plate 35 closes off the nozzles 13, it will be clear from the drawing that by movement of plate 36 toward the left (with regard to Fig. 7) first the outermost right hand nozzles, then the nozzles next to them, etc., will be opened so that, when plate 36 has completed a predetermined leftward stroke, all nozzles have been opened in a predetermined sequence, namely from the right-hand end of Fig. 7, where the fiery material is to be poured into the tub, to the left-hand end of the tub. As will also be clear from Figure 7, the apertures 36, 36a, 36b, etc., increase in width from the left-hand side to the right-hand side of plate 36, so that the nozzles while being opened will not be closed again while plate 36 is performing its leftward movement to bring about the successive opening of the remainder of the nozzles.

This arrangement makes it possible to convey the foaming means to the nozzles only in the sequence in which the nozzles are reached by the oncoming slag poured into the tub. The movement of plate 35 may be effected in any desired manner by means of any convenient equipment, as for instance hydraulic control means appropriately connected thereto.

It is, of course, understood that the present invention is by no means limited to the particular construction shown in the drawings, but also comprises any modifications within the scope of the appended claims.

What I claim is:

1. A method of making porous material from fiery molten masses such as furnace slag, which includes the steps of pouring the molten slag mass into a flat-bottomed tub and across the bottom of said tub to a substantially uniform depth, the surfaces which are contacted by said slag being covered with a liquid capable of vaporizing under the influence of heat contained in said molten slag mass, introducing a controlled amount of said liquid under pressure into the molten slag mass in said tub from beneath the molten slag mass to cause vaporization of a substantial amount of said liquid and the production of a porous slag mass, flowing away excess liquid unvaporized from said porous slag mass after the desired porosity of the mass has been obtained, evaporating residual liquid retained in said porous slag mass utilizing heat remaining in said slag mass, and discharging the resultant substantially dry slag mass from said bed.

2. A method of making porous material from fiery molten masses such as furnace slag, which includes the steps of moistening with water the bottom of a tub adapted to receive fiery molten masses, while moistening the pouring-in end of the bottom of said tub to a greater extent than the other parts of said bottom, spraying the end walls of said tub prior to pouring in the slag to prevent slag when poured into said tub from adhering to said walls, pouring fiery molten masses into said tub while introducing water under pressure into said tub through openings distributed over the bottom of said tub to cause foaming of the material while bringing about evaporation of a part of said water to thereby produce pores in said mass, prior to the end of said foaming action removing substantially all the water from said tub.

3. In an apparatus for use in connection with the making of porous material from fiery molten masses such as furnace slag, supporting means, a tub having a sloping pouring-in side wall means, said tub being tiltably connected to said supporting means and arranged to receive fiery molten masses flowed thereinto and across the bottom of said tub to a substantially uniform depth, nozzle means distributed over the bottom of said tub for admitting a foaming agent into said tub, conduit means connected to said nozzle means for conveying a foaming agent thereto, and means associated with said tub and operable to release the foaming agent from said tub.

4. In an apparatus for use in connection with the making of porous material from fiery molten masses such as furnace slag, supporting means, a flat tub having a sloping pouring-in side wall means, said tub being tiltably connected to said supporting means and arranged to receive fiery molten masses flowed thereinto and across the bottom of said tub to a substantially uniform depth, nozzle means connected to and distributed over the bottom of said tub and opening into said tub for conveying water into said tub, water supply pipes connected to said nozzle, discharge conduit means connected to the bottom of said tub for withdrawing water from said tub, and means associated with said tub for tilting the same.

5. In an apparatus for use in connection with the making of porous material from fiery molten masses such as furnace slag, supporting means, a tub having a sloping pouring-in side wall means, said tub being tiltably connected to said supporting means and arranged to receive fiery molten masses flowed thereinto and across the bottom of said tub to a substantially uniform depth, nozzle means mounted in and distributed over the bottom of said tub, conduit means connected to said nozzle means for conveying a foaming agent thereto, means associated with the bottom of said tub for releasing the foaming agent therefrom, means associated with said tub for tilting the same in order to empty said tub of the porous material formed therein, and means arranged at one end of the tub for adjustably supporting said tub in a position to receive said molten masses.

6. In an apparatus for use in connection with the making of porous material from fiery molten masses such as furnace slag, supporting means, a tub adapted to receive fiery molten masses flowed thereinto and across the bottom of said tub to a substantially uniform depth and tiltably connected to said supporting means to allow tilting of said tub for emptying the same of porous material formed therein, said tub being provided with a sloping pouring-in side wall and a double bottom, supply conduit means associated with said double bottom for supplying a foaming agent into the space confined by said double bottom, nozzle means distributed over the bottom of said tub extending from said last-mentioned space into said tub for effecting communication between said space and said tub, discharge means associated with said double bottom for releasing a foaming agent from said tub toward the outside thereof, valve means associated with said supply and discharge means for controlling the connections thereof with said tub, and means associated with said tub for tilting the same.

7. In an apparatus for use in connection with the making of porous material from fiery molten masses such as furnace slag, supporting means, a tub having a sloping pouring-in side wall adapted to receive fiery molten masses flowed thereinto and across the bottom of said tub to a substantially uniform depth, nozzle means mounted in and distributed over the bottom of said tub, said tub being connected to said supporting means to allow tilting of said tub for removing therefrom porous material formed in said tub, supply conduit means connected with the nozzle means in said tub for supplying a foaming agent thereto, a portion of said supply conduit means having its axis coinciding with the tilting axis of said tub, discharge conduit means associated with said tub for discharging the foaming agent from said tub, and valve means associated with said supply and discharge conduit means for controlling the same.

8. In an apparatus for use in connection with the making of porous material from fiery molten masses such as furnace slag, supporting means, a tub having a sloping pouring-in side wall adapted to receive fiery molten masses flowed thereinto and across the bottom of said tub to a substantially uniform depth, said tub being provided at its loading end with an inclined wall facilitating the sliding into said tub of the material to be treated therein, fluid inlet means mounted in and distributed over the bottom of said tub, conduit means connected with said fluid inlet means and adapted to be connected with a fluid source, fluid outlet means connected with the bottom of said tub for withdrawing fluid from the slag foamed in the tub, valve means associated with said fluid inlet means and said fluid outlet means to control the passage of fluid therethrough, and means associated with said tub for tilting the latter about an axis adjacent the end of said tub opposite said inclined wall.

9. In an apparatus for use in connection with the making of porous material from fiery molten masses such as furnace slag, supporting means, a tub having a sloping pouring-in side wall adapted to receive fiery molten masses flowed thereinto and across the bottom of said tub to a substantially uniform depth, said tub being mounted on said supporting means and arranged to be tilted for emptying the tub of porous material formed therein, said tub being provided with an inclined wall to facilitate the unloading of the tub of porous material formed therein, first conduit means associated with the bottom of said tub for admitting to said tub a fluid medium adapted to be evaporated, second conduit means associated with said tub for withdrawing said fluid medium therefrom, valve means respectively associated with said first and second conduit means for controlling the passage of fluid therethrough, and means associated with said tub for tilting the same.

10. In an apparatus for use in connection with the making of porous material from fiery molten masses such as furnace slag, supporting means, a tub having a sloping pouring-in side wall means, said tub being tiltably connected to said supporting means and arranged to receive fiery molten masses flowed thereinto and across the bottom of said tub to a substantially uniform depth, one wall portion of said tub being provided with a flap valve adapted selectively to be moved into an open or into a close position, nozzle means associated with and distributed over the bottom of said tub for admitting a foaming agent into said tub, conduit means connected to said nozzle means for conveying a foaming agent thereto, and means associated with said tub and operable to release the foaming agent from said tub.

11. In an apparatus for use in connection with the making of porous material from fiery molten masses such as furnace slag, supporting means, a tub having a sloping pouring-in side wall adapted to be charged with fiery molten masses and tiltably connected to said supporting means, said tub being provided with a detachable bottom having openings therein for admitting a fluid medium into said tub to cause foaming of the fiery molten material when the latter is in said tub, means associated with said bottom for admitting a fluid medium to said openings and for releasing the fluid medium from said tub, and means associated with said tub for tilting the same.

12. In an apparatus for use in connection with the making of porous material from fiery molten masses such as furnace slag, supporting means, a tub tiltably connected to said suporting means and adapted to receive fiery molten masses, supply conduit means associated with the bottom of said tub for conveying a foaming agent into said tub, discharge conduit means also associated with the bottom of said tub for discharging the foaming agent from said tub, and three-way valve means associated with said supply and said discharge conduit means and operable selectively to be moved into position for conveying the foaming agent to said tub while preventing its discharge from said tub, or into a position in which it prevents the supply of the foaming agent into the tub, while allowing the discharge of the foaming agent from said tub, said three-way valve means also being movable into a third position in which the supply of the foaming agent to the tub and the withdrawal of the foaming agent from the tub is prevented.

13. In an apparatus for use in connection with the making of porous material from fiery molten masses such as furnace slag, supporting means, a tub having a sloping pouring-in side wall means, said tub being tiltably connected to said supporting means and arranged to receive fiery molten masses flowed thereinto and across the bottom of said tub to a substantially uniform depth, nozzle means distributed over the bottom of said tub for admitting a foaming agent into said tub, conduit means connected to said nozzle means for supplying a foaming agent to said nozzle means, additional conduit means for withdrawing the foaming agent from said tub, and means associated with said two mentioned conduit means to allow scavenging of said conduit means.

14. In an apparatus for use in connection with the making of porous material from fiery molten masses such as furnace slag, supporting means, a tub having a sloping pouring-in side wall and adapted to receive fiery molten masses flowed thereinto and across the bottom of said tub to a substantially uniform depth, said tub being tiltably connected to said supporting means, nozzle means associated with and distributed over the bottom of said tub for selectively admitting a foaming agent under pressure into or withdrawing the foaming agent from said tub, spray means arranged at least adjacent to said pouring-in side wall over which the fiery molten mass enters said tub, and means associated with said tub for tilting the same.

15. In an apparatus for use in connection with the making of porous material from fiery molten masses such as furnace slag, a tub arranged to receive fiery molten masses, a plurality of nozzle means associated with and distributed over the bottom of said tub for respectively admitting a foaming agent into said tub, means arranged for communication with said nozzle means to convey a foaming agent thereto, and control means associated with said nozzle means and operable to open the respective nozzles thereof only sequentially, i. e., in the sequence in which they are reached by the fiery molten masses poured into said tub.

16. The method of treating molten slag by contact with a liquid capable of vaporizing under the influence of heat contained in the slag to cause swelling of the slag with the production of a porous plastic mass of foamed slag having a substantially greater volume than the volume of the molten slag, which comprises pouring a mass of molten slag onto an inclined surface which is covered with foaming liquid, flowing the slag from the inclined surface into a pit having a substantially moisture impervious bottom, initially introducing foaming liquid directly into the pit from outlet sources provided at the surface of the bottom to provide a relatively shallow layer of foaming liquid in the pit prior to the introduction of the molten slag, continuously flowing the slag across the bottom of the pit in a unidirectional flow while introducing additional controlled amounts of foaming liquid directly into the slag from the outlet sources, and arresting the motion of the slag flow to permit foaming through the action of foaming liquid entrapped beneath the slag.

17. The method of treating molten slag by contact with a liquid capable of vaporizing under the influence of heat contained in the slag to cause swelling of the slag with the production of a porous plastic mass of foamed slag having a substantially greater volume than the volume of the molten slag, which comprises pouring a mass of molten slag onto an inclined surface which is covered with foaming liquid, flowing the slag from the inclined surface into a pit having a substantially moisture impervious bottom, initially introducing foaming liquid directly into the pit from outlet sources provided at the surface of the bottom to provide a relatively shallow layer of foaming liquid in the pit prior to the introduction of the molten slag, continuously flowing the slag across the bottom of the pit in a unidirectional flow while introducing additional controlled amounts of foaming liquid directly into the slag from the outlet sources, and arresting the motion of the slag flow to permit foaming through the action of foaming liquid entrapped beneath the slag.

18. The method of treating molten slag by contact with a liquid capable of vaporizing under the influence of heat contained in the slag to cause swelling of the slag with the production of a porous plastic mass of foamed slag having a substantially greater volume than the volume of the molten slag, which comprises pouring a mass of molten slag onto an inclined surface which is covered with foaming liquid, flowing the slag from the inclined surface into a pit having a substantially moisture impervious bottom, initially introducing foaming liquid directly into the pit from outlet sources provided at the surface of the bottom to provide a relatively shallow layer of foaming liquid in the pit prior to the introduction of the molten slag, the molten slag being poured from an initial pouring head sufficient to move the slag across the bottom of said pit in a unidirectional flow, introducing additional controlled amounts of foaming liquid directly into the slag from said outlet sources as the slag is moved across the bottom of the pit, arresting the motion of the slag flow to permit foaming through the action of foaming liquid entrapped beneath the slag, and recovering the foamed slag from the pit.

19. The method of treating molten slag by contact with a liquid capable of vaporizing under the influence of heat contained in the slag with the production of a porous plastic mass of foamed slag having a substantially greater volume than the volume of the molten slag, which comprises pouring a mass of molten slag onto an inclined surface which is covered with foaming liquid to initiate foaming of the slag, flowing the foaming slag from the inclined surface into a pit having a substantially moisture impervious bottom, initially introducing foaming liquid directly into the pit from outlet sources provided at the surface of the bottom to provide a relatively shallow layer of foaming liquid in the pit prior to the introduction of the slag, continuously flowing the slag across the bottom of the pit in a unidirectional flow while introducing additional controlled amounts of foaming liquid directly into the slag from the outlet sources, and arresting the motion of the slag flow to permit complete foaming of the slag through the action of foaming liquid entrapped beneath the slag.

References Cited in the file of this patent

UNITED STATES PATENTS

| | | |
|---|---|---|
| 1,117,644 | Donaldson | Nov. 17, 1914 |
| 1,383,691 | Barker | July 5, 1921 |
| 1,849,090 | Hunsaker | Mar. 15, 1932 |
| 1,865,367 | Gorsuch | June 28, 1932 |
| 2,023,511 | Brosius | Dec. 10, 1935 |
| 2,024,308 | Schol | Dec. 17, 1935 |
| 2,044,450 | Schol | June 16, 1936 |
| 2,212,962 | Stuart et al. | Aug. 27, 1940 |
| 2,428,249 | Stuart et al. | Sept. 30, 1947 |
| 2,443,103 | Gallai-Hatchard | June 8, 1948 |

FOREIGN PATENTS

| | | |
|---|---|---|
| 273,519 | Germany | May 6, 1914 |
| 95,003 | Switzerland | June 1, 1922 |
| 180,479 | Great Britain | June 1, 1922 |
| 444,318 | Germany | May 23, 1927 |
| 444,699 | Great Britain | Mar. 25, 1936 |